Patented Oct. 21, 1924.

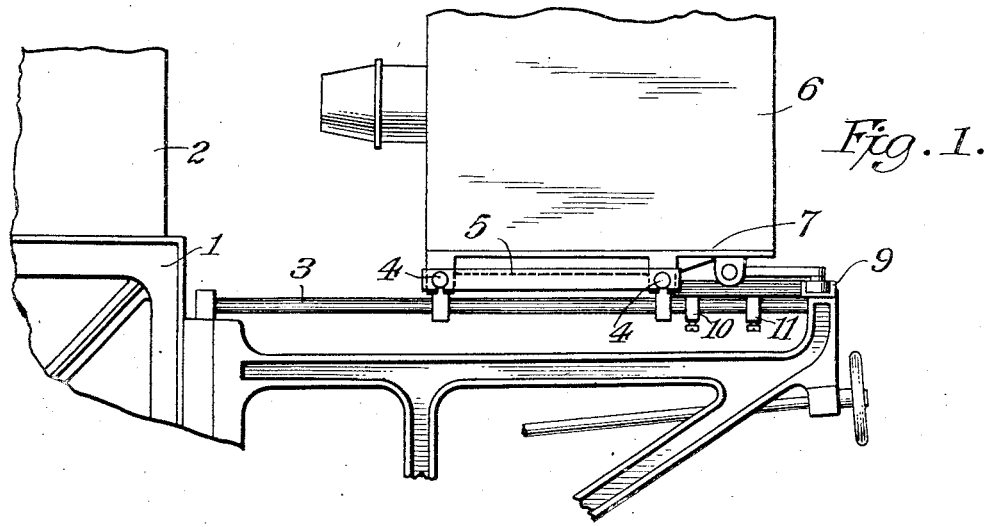
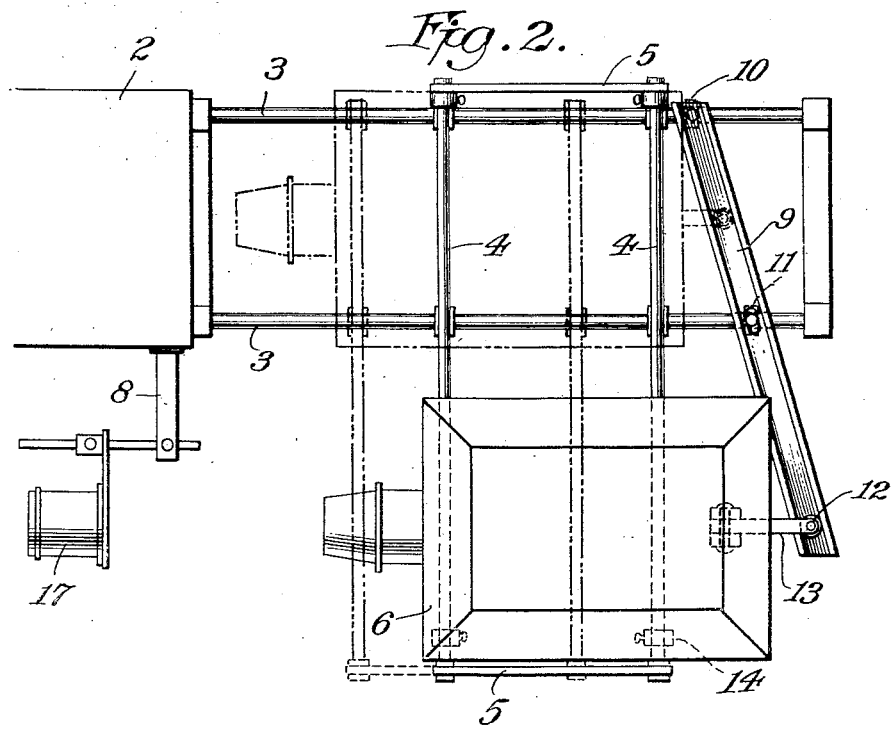

1,512,148

UNITED STATES PATENT OFFICE.

THEODORE F. UHLEMANN, OF NEW YORK, N. Y., ASSIGNOR TO NICHOLAS POWER COMPANY, INC., OF NEW YORK, N. Y., A CORPORATION OF DELAWARE.

ADJUSTABLE LAMP HOUSE.

Application filed July 2, 1920. Serial No. 393,601.

*To all whom it may concern:*

Be it known that I, THEODORE F. UHLEMANN, a citizen of the United States, and a resident of the county of Queens, city and State of New York, have invented new and useful Improvements in Adjustable Lamp Houses, of which the following is a specification.

This invention relates to lamp house supports for motion picture machines, and has for its object to provide a lamp house support by means of which the lateral adjustment of the lamp house from a position in line with the motion picture machine to its position behind the stereopticon projector, and vice versa, will also shift the lamp house toward and from the apparatus to the necessary extent to focus the light.

The invention of the present application is particularly adaptable for use in connection with incandescent light equipments for motion picture apparatus for the reason that such lights are usually designed to be brought close to the film in order to conserve as much light as possible, while they are necessarily shifted further away from the stereopticon lens in order for the illuminated area to be large enough to take in the full area of the slide.

In conducting the exhibition the change from the motion picture to the still picture should be made as rapidly as possible in order not to have the screen dark, and it has been found that to both shift the lamp horizontally of the stand and then adjust it toward and away from the stereopticon or moving picture machine, as the case may be, to properly focus the light, requires an appreciable length of time which detracts from the exhibition. By the arrangement of the present invention the focusing of the light for both the motion picture machine and the stereopticon may be done before the exhibition starts, and a simple shifting of the lamp house as far as it will go from one side to the other will thereafter effect the complete readjustment of the lamp.

In the accompanying drawings I have illustrated a preferred adaptation of my invention to a standard type of motion picture projecting machine, and in said drawings, Figure 1 shows my improved lamp house support in side elevation with so much of the motion picture machine, lamp house and stand illustrated as necessary to understand the operation of the support; and Fig. 2 is a plan view of the structure shown in Fig. 1.

Referring to the drawings, 1 indicates the supporting frame for the motion picture projector which is indicated at 2. Attached to the rear face of the stand 1 is a lamp house support or bracket which is provided across the top with a pair of fixed guide rails or rods 3 extending longitudinally of the machine, that is, parallel with the optical axis of the projecting lenses.

Slidingly mounted on the rods 3 are a pair of transverse rods 4 connected at their ends by bars 5 to form a rectangular frame adjustable longitudinally along the rod 3.

Supported for transverse adjustment on the rods 4 is a lamp house 6 comprising the usual base 7 having grooved rollers, not shown, at each corner, working on the tracks 4. The structure so far described is the ordinary lamp house equipment for motion picture machines, the tracks 4 being long enough for the lamp house to be adjusted from a position in line with the projector as indicated in broken lines in Fig. 2 to a position in line with the stereopticon lenses 17 supported in the usual manner on the bracket 8 projecting from the projector 2, that is, to the full line position shown in Fig. 2.

In order to provide for the simultaneous longitudinal and transverse adjustment of the lamp house to the predetermined necessary extent I preferably provide a track 9 in the shape of a channel bar at the rear end of the longitudinal tracks 3, the track 9 being supported on collars 10 and 11 adjustable independently along the two rods 3 respectively. The track 9 is swiveled to the collars and has a slotted engagement with collar 11 so that the relative adjustment of the collars on the tracks determines the angle of the track with relation to the transverse guide rods 4.

Working in the channel of the track is a roller 12 carried at the end of an arm 13 pivoted on the base plate of the lamp house so that the roller may be readily raised out of the track in case it is desired to move the track or lamp house independently of each other. The tracks 4 are provided near each end with lugs 14 which may be adjusted along the tracks to limit the movement of the lamp house into its extreme position of adjustment in line with the motion picture projector and the stereopticon projector, respectively.

The operation of the device will be obvious from the above description. Before the exhibition starts the track 9 will be adjusted so that when the lamp house is at one extreme position as permitted by the lugs 14 the position of the roller 12 in the track 9 will position the lamp house at the proper focal distance from the motion picture projector and when the lamp house is at the extreme position of lateral adjustment with the roller still in the track the lamp house will then be shifted rearwardly to the exact distance necessary to properly cooperate with the stereopticon lenses 17. With the track fixed in this position by the clamping screws of the lugs 10 and 11, a mere lateral adjustment of the lamp house will shift it longitudinally to just the required extent to cooperate properly with one machine or the other. Hence the transition from the motion picture to the still picture may be accomplished in a minimum of time.

I have shown my improvement applied to a motion picture stand of a particular type which is well known in the trade, but it is obvious that with slight modifications in the details of the attachment, etc., the improvement may be applied to other types of picture machines. It will be obvious, also, that various changes may be made in the details of the design without departing from the spirit of the invention.

I claim:

1. In a motion picture apparatus, a lamphouse and a stand therefor constituting parts of the apparatus, said lamp house being adjustable longitudinally and transversely of the stand, and guiding means whereby a movement of the lamphouse of predetermined extent in one of said directions upon the movement of said house in the other direction may be effected, said means comprising a guide associated with one of the said two parts of the apparatus and a cooperating element provided on the other of said parts for engagement with said guide.

2. In a motion picture apparatus, a lamphouse and a stand therefor constituting parts of the apparatus, said lamp house being adjustable longitudinally and transversely of the stand, guiding means whereby a movement of the lamphouse of predetermined extent in one of said directions upon the movement of said house in the other direction may be effected, said means comprising a guide associated with one of the said two parts of the apparatus and a cooperating element provided on the other of said parts for engagement with said guide, and means whereby said guide may be adjusted to vary the relative extent of said predetermined movement.

3. In a motion picture apparatus, a lamp house, a stand therefor, said lamp house being adjustable on said stand both longitudinally and transversely thereof, and means for controlling the adjustment between the stand and the lamp house comprising a track member fixed to one of said members at an angle to the longitudinal and a guide carried by the other of said members and working on said track.

4. In a motion picture apparatus, a lamp house, a stand therefor, said lamp house being adjustable on said stand both longitudinally and transversely thereof, and means for controlling the adjustment between the stand and the lamp house comprising a track member fixed to one of said members at an angle to the longitudinal and a guide carried by the other of said members and working on said track, said track being angularly adjustable to alter the extent of movement in one direction upon a predetermined movement in the other direction.

5. In motion picture apparatus, the combination of a lamp house, a stand therefor, supporting tracks extending longitudinally and transversely thereof, said lamp house being adjustable in parallelism with said tracks, and means for causing a predetermined adjustment in one direction to effect an adjustment in the other direction comprising a guide track attached to one pair of said supporting tracks at an angle thereto, and a guide member carried by the lamp house engaging said track.

6. In motion picture apparatus, the combination of a lamp house, a stand therefor, supporting tracks extending longitudinally and transversely thereof, a lamp house adjustable in parallelism with said tracks, and means for causing a predetermined adjustment in one direction to effect an adjustment in the other direction comprising a guide track attached to one pair of tracks at an angle thereto, and a guide member carried by the lamp house engaging said track, said guide track being adjustable with relation to its supporting tracks whereby the relative movements of the lamp house in the two directions may be varied.

7. In motion picture apparatus, the combination of a lamp house, a stand therefor, supporting tracks extending longitudinally and transversely thereof, a lamp house adjustable in parallelism with said tracks and means for causing a predetermined adjustment in one direction to effect an adjustment in the other direction comprising a guide track attached to one pair of said supporting tracks at an angle thereto, a guide member carried by the lamp house engaging said tracks and stops for limiting the movement of the lamp house in the direction of one set of supporting tracks.

Signed at New York, in the county of New York and State of New York, this 2nd day of June, 1920.

THEODORE F. UHLEMANN.